US007766066B2

(12) United States Patent
Hyodo

(10) Patent No.: US 7,766,066 B2
(45) **Date of Patent: *Aug. 3, 2010**

(54) COATING FILM TRANSFER TOOL

(75) Inventor: Taiji Hyodo, Tokyo (JP)

(73) Assignee: Tombow Pencil Co., Ltd., Tokyo (JP)

(*) Notice: Subject to any disclaimer, the term of this patent is extended or adjusted under 35 U.S.C. 154(b) by 412 days.

This patent is subject to a terminal disclaimer.

(21) Appl. No.: 11/897,213

(22) Filed: Aug. 29, 2007

(65) Prior Publication Data

US 2008/0078323 A1 Apr. 3, 2008

(30) Foreign Application Priority Data

Sep. 29, 2006 (JP) ............................ 2006-268899

(51) Int. Cl.
*B32B 37/26* (2006.01)
*B26F 3/02* (2006.01)
*B43L 19/00* (2006.01)

(52) U.S. Cl. ....................... 156/577; 156/527; 156/579; 118/76; 118/200; 118/257; 242/588; 242/588.3; 242/588.6; 242/160.2; 242/160.4; 242/170; 242/171; 206/411

(58) Field of Classification Search ................. 156/523, 156/527, 538, 540, 574, 577, 579; 118/76, 118/200, 257; 225/46; 242/160.2, 160.4, 242/170, 171, 588, 588.2, 588.3, 588.6; 206/411
See application file for complete search history.

(56) References Cited

U.S. PATENT DOCUMENTS

| | | | | |
|---|---|---|---|---|
| 6,730,186 | B2 * | 5/2004 | Takahashi | 156/238 |
| 6,761,200 | B2 * | 7/2004 | Shinya | 156/577 |
| 2007/0193694 | A1 * | 8/2007 | Simmelsgaard et al. | 156/579 |

FOREIGN PATENT DOCUMENTS

| | | |
|---|---|---|
| JP | 2004-268322 A | 9/2004 |

* cited by examiner

*Primary Examiner*—Mark A Osele
(74) *Attorney, Agent, or Firm*—Scott D. Wofsy; Joshua L. Jones; Edwards Angell Palmer & Dodge LLP

(57) ABSTRACT

A coating film transfer tool has a front end portion of a case main body with a head cap slidably disposed in front and rear directions between an advanced position in a state of covering a transfer head and a rear position in a state of exposing the transfer head. The head cap is urged in a direction of the advanced position by a spring, when started to be used. By pressing a front end portion of the head cap against a face, the head cap can be moved to the rear position. Inside the case main body is a tape reeling out means for reeling out a transfer tape to the transfer head. The tape reeling out means moves in cooperation with movement of the head cap to the rear position when started to be used, to be able to reel out the transfer tape to the transfer head.

4 Claims, 8 Drawing Sheets

COATING FILM TRANSFER TOOL

BACKGROUND OF THE INVENTION

1. Field of the Invention

The present invention relates to a coating film transfer tool provided with a head cap for protecting a transfer tape when the tool is not used, and it particularly relates to a coating film transfer tool capable of preventing coating film detachment of a transfer tape in a transfer head when started to be used.

2. Description of the Related Art

There is known a coating film transfer tool (JP-A-2004-268322) in which a supply reel and a take-up reel are provided inside of a case main body, a transfer tape wound around the supply reel is reeled by the take-up reel and thereby guided along a transfer roller of a transfer head projected from a front end opening of the case main body, a head cap for covering the transfer head is provided at a front end portion of the case main body, the head cap can slide in front and rear directions between an advanced position in a state of covering the transfer head and a rear position in a state of exposing the transfer head, and the head cap is urged in a direction of the advanced position by a spring.

Such a coating film transfer tool is made to be usable by moving back the head cap, when used, to inside of the case main body against an urge force of the spring by an operation of pressing against a face thereby exposing the transfer tape along with the transfer head.

On the other hand, when not used, the head cap is moved forward by the urge force of the spring to cover the transfer head, thereby, the transfer tape is protected and a coating film is prevented from being erroneously transferred onto other portion.

However, according to the coating film transfer tool of the related art a transfer is carried out by drawing the transfer tape from the supply reel due to a friction resistance produced between the face on which a transfer is to be made (hereinafter referred to transfer face) and a coating film coated onto the transfer tape when the transfer head is slid while being pressed against the transfer face, and therefore, during transfer, a tensile force is exerted to the transfer tape between the supply reel and the transfer roller by a friction resistance on account of an adhering force of the coating film acting between layers of the transfer tape wound around the supply reel, and the transfer tape is extracted while being elongated.

Therefore, after finishing a transfer operation, when the transfer head is detached from the transfer face, the elongated transfer tape is returned towards the direction of the supply reel by being contracted to recover, and only the tape exfoliated with the coating film remains on the transfer roller.

Thereby, in starting to a successive use, coating film detachment of the transfer tape is brought about at the transfer head, even when the transfer head is pressed against the transfer face, since the coating film is not present on the tape, there arises a problem that a non-transferred portion in accordance with an amount of returning the tape is brought about at the transfer face to constitute a factor of idle slip.

SUMMARY OF THE INVENTION

In view of the problems involved with the prior art, it is an object of the invention to provide an improved coating film transfer tool. Another object of the invention is to provide a coating film transfer tool capable of firmly preventing a non-transfer portion from being brought about at a transfer face by coating film detachment of a transfer tape at a transfer head and of eliminating idle slip at every time when starting to use the tool.

According to the invention, this problem is solved by a coating film transfer tool provided with a first gear mounted with a supply reel and a second gear mounted with a take-up reel provided inside of a case main body in which a transfer tape wound around the supply reel is taken up by the take-up reel and guided along a transfer head projected from a front end opening of the case main body. A front end portion of the case main body is provided with a head cap which can slide in front and rear directions between an advanced position in a state for covering the transfer head and a rear position in a state for exposing the transfer head. The head cap is urged in a direction of the advanced position by a spring. When started to be used, the head cap can be moved to the rear position by pressing a front end portion of the head cap against the transfer face. Inside of the case main body there is provided a tape reeling out means for reeling out the transfer tape to the transfer head. The tape reeling out means is moved in cooperation with a movement of the head cap to the rear position when started to be used, to be able to reel out the transfer tape to the transfer head.

According to an embodiment of the invention the tape reeling out means at least including a rack moved in cooperation with a movement in the front and rear directions of the head cap, and a pinion which is in meshing engagement with the rack and the first gear when the head cap is moved to the rear position, and which is not in a meshing engagement with the first gear when the head cap is moved to the advanced position.

According to another embodiment of the invention the pinion is made to be detached from the rack at the rear position of the head cap.

According a further embodiment of the invention the head cap is disposed at the advanced position after having been detached from the rack, the pinion is made detachable from the first gear to an original position at which the pinion was disposed.

According to the invention, the following effect is achieved.

Since the front end portion of the case main body is provided with the head cap being slidable in front and rear directions between the advanced position in the state for covering the transfer head and the rear position in the state for exposing the transfer head, the head cap is urged in the direction of the advanced position by the spring, the head cap can be moved to the rear position by pressing the front end portion of the head cap against the transfer face when started to be used, inside of the case main body there is provided the tape reeling out means for reeling out the transfer tape to the transfer head, and the transfer tape is made to be able to reel out to the transfer head by moving the tape reeling out means in cooperation with the movement of the head cap to the rear position by operating to press the transfer face, therefore at every time of starting to be used, by pressing the front end portion of the head cap against the transfer face, the head cap is moved from the advanced position to the rear position, the transfer tape can automatically be reeled out to the transfer head, a non-transfer portion can firmly be prevented from being brought about at the face on which a transfer is to be made and an idle slip can be eliminated.

Since the tape reeling out means at least includes the rack moved in cooperation with the movement in the front and rear direction of the head cap and the pinion movable to be able to be brought in mesh with the rack when the head cap is advanced and to be able to be brought in mesh with the first gear by moving the rack when the head cap is moved back, therefore the tape reeling out means can firmly be moved in cooperation with the movement of the head cap from the advanced position to the rear position of the head cap at every time of starting to be used by a simple structure.

Since the pinion is detached from the rack at the rear position of the head cap, therefore the transfer tape can smoothly be reeled out to the transfer head at every time of starting to be used.

Since when the head cap is disposed at the advanced position, after having been detached from the rack, the pinion is made detachable from the first gear to the original position at which the pinion was disposed, therefore the transfer tape can smoothly be reeled out to the transfer head at successive time of starting to be used.

The accompanying drawings which are incorporated in and constitute part of the present specification, are included to illustrate and provide for a further understanding of the invention.

DETAILED DESCRIPTION OF THE PREFERRED EMBODIMENT

Figure 1:
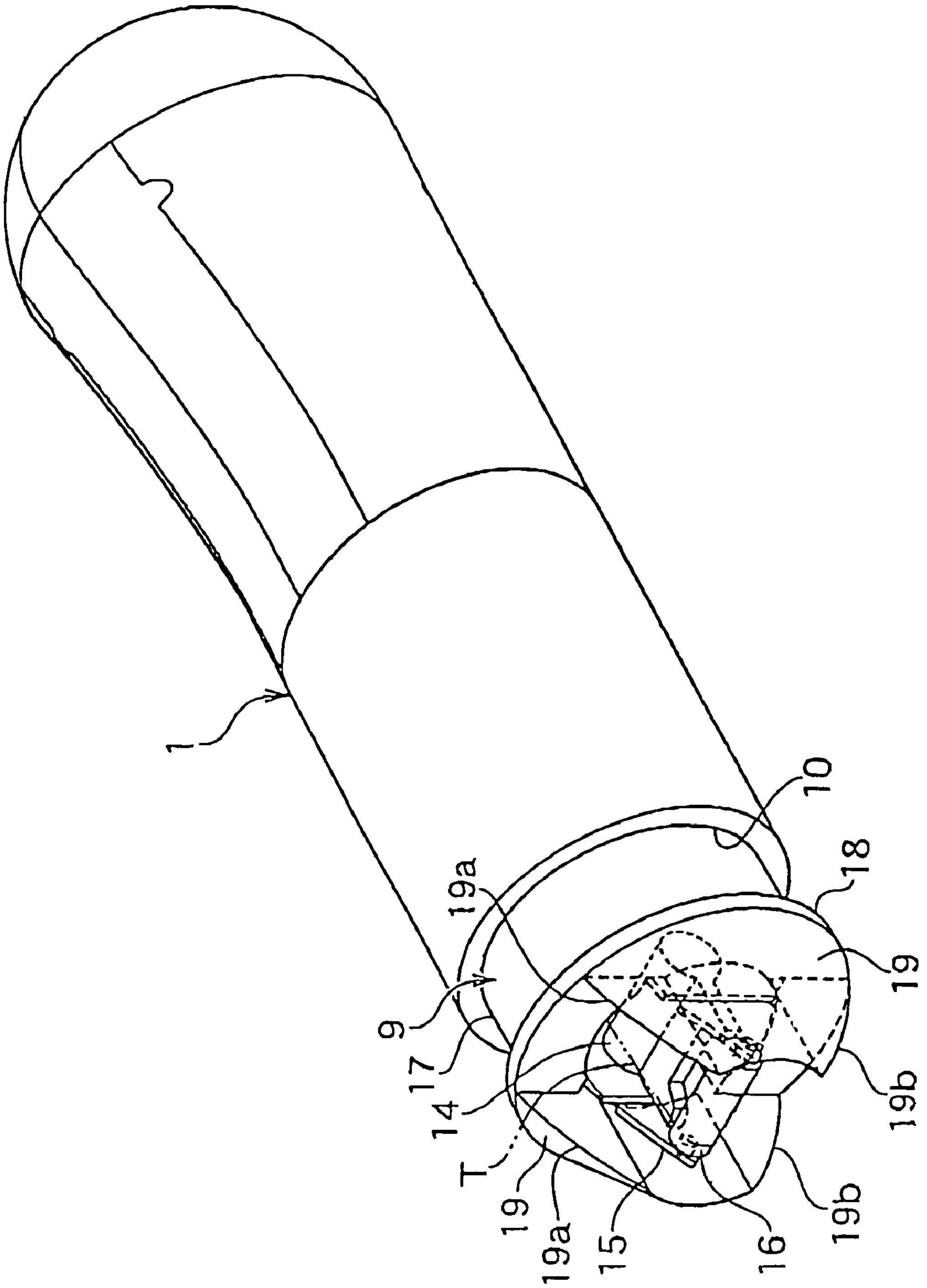
FIG. 1 is a perspective view of a coating film transfer tool according to an embodiment of the invention in a state of protecting a transfer head when not used.
Figure 2:
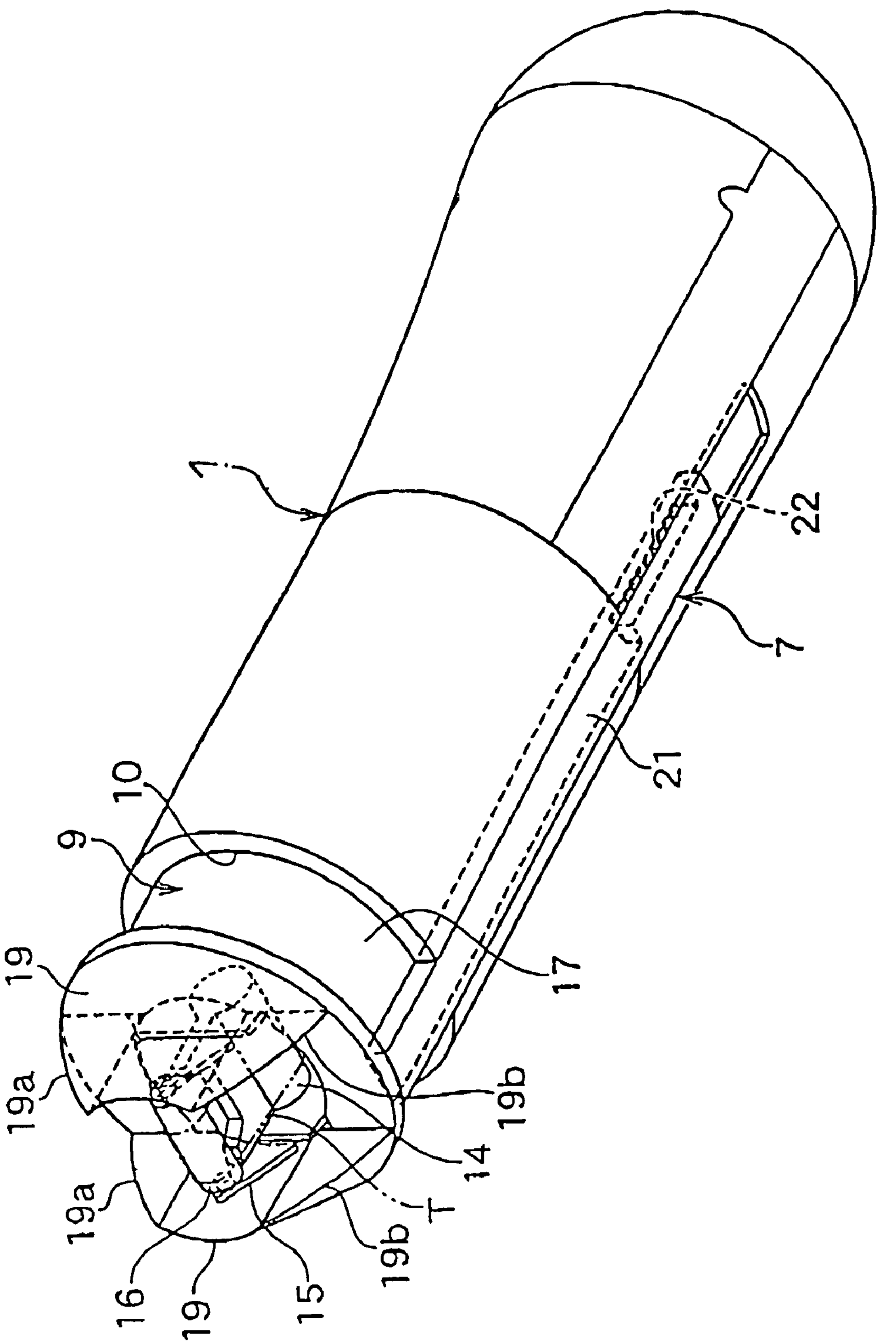
FIG. 2 is a perspective view of the coating film transfer tool when viewing from a lower side thereof.
Figure 3:
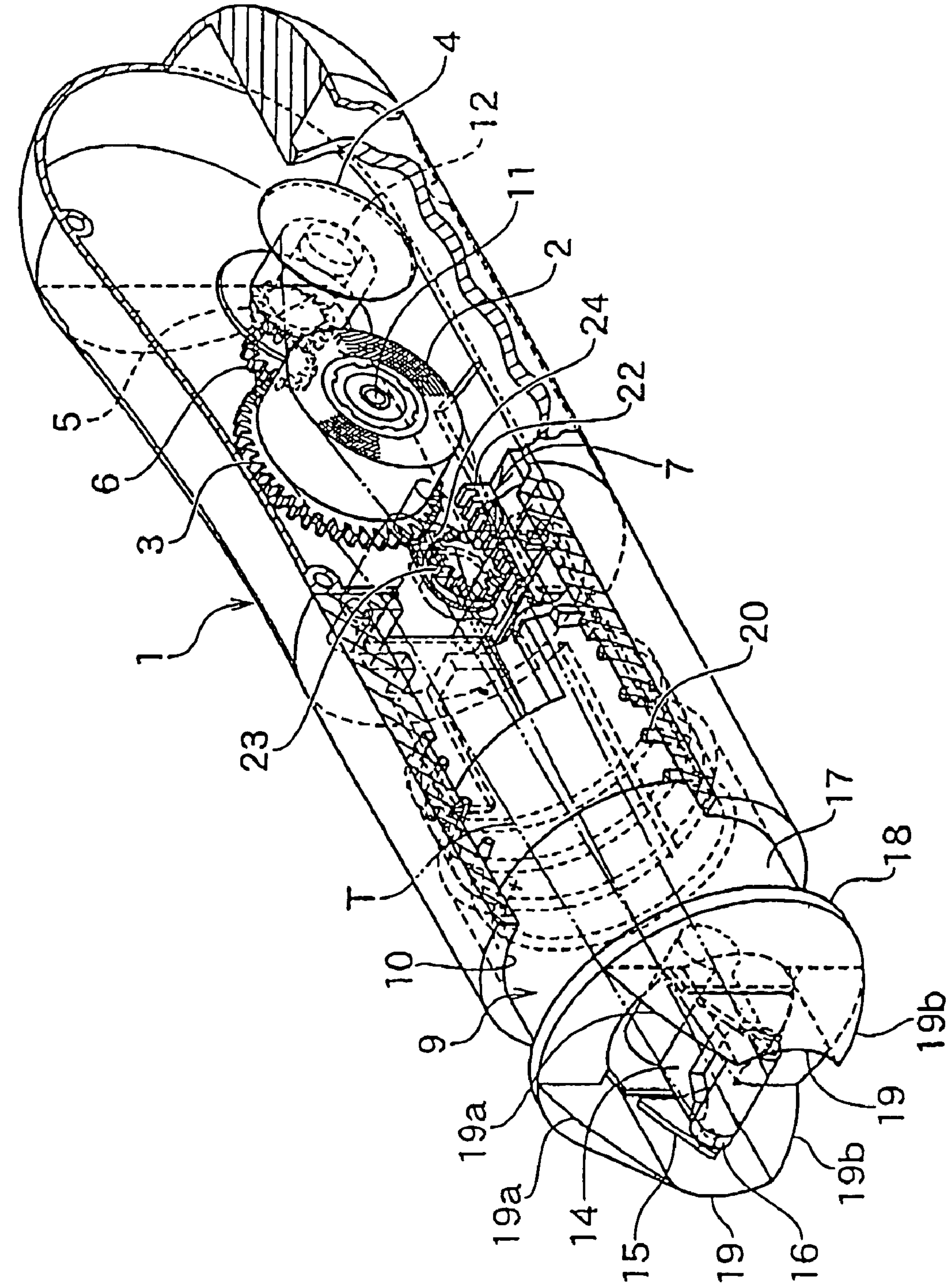
FIG. 3 is a partially broken perspective view of the coating film transfer tool.
Figure 4:
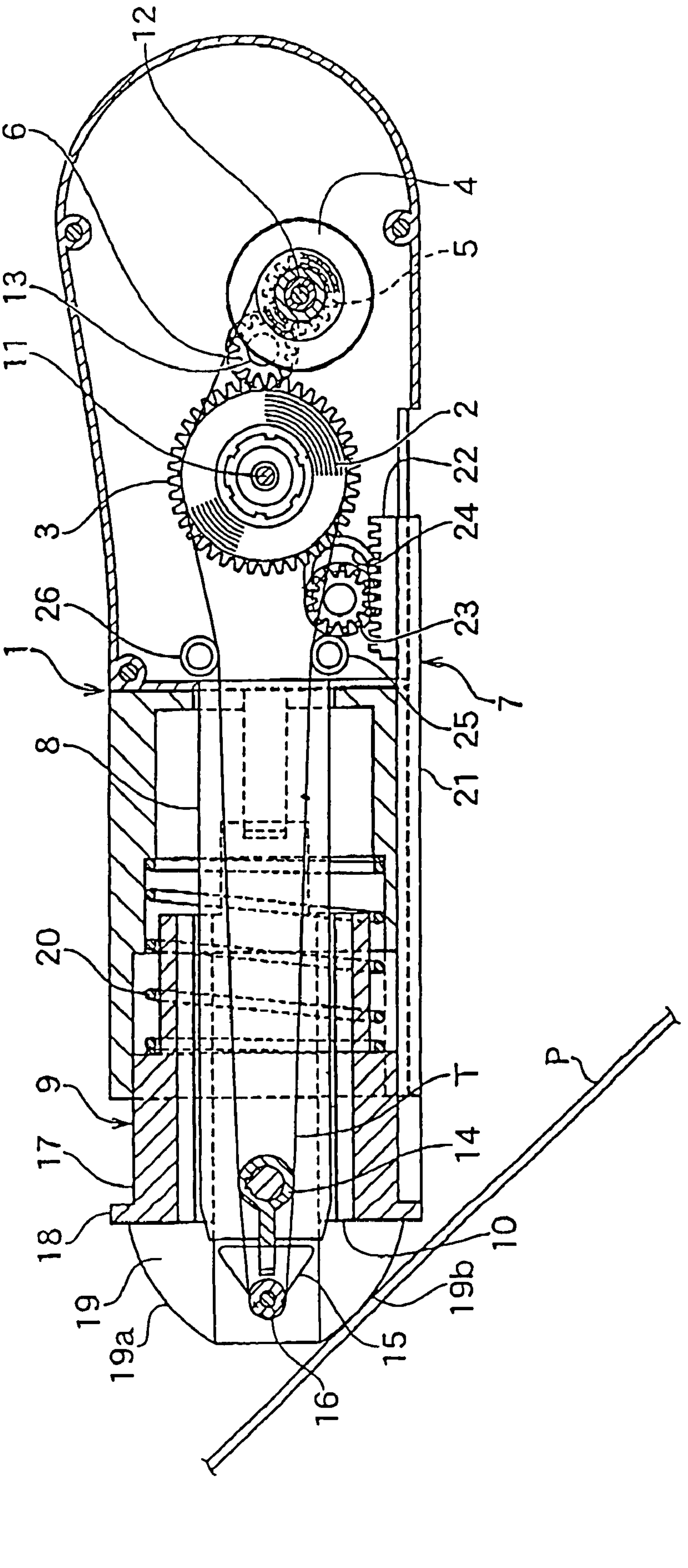
FIG. 4 is a vertical sectional side view of the coating film transfer tool.
Figure 5:
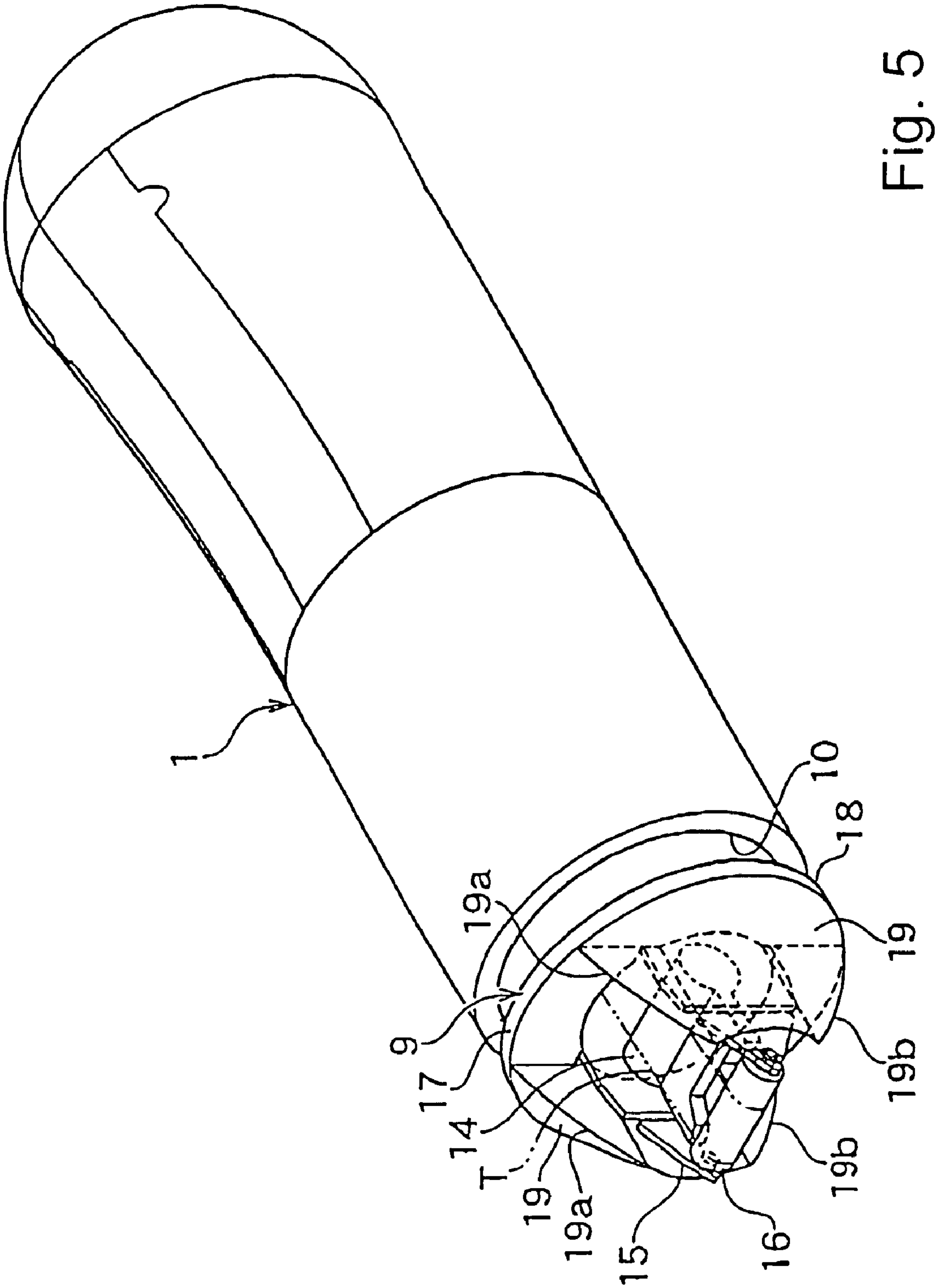
FIG. 5 is a perspective view of the coating film transfer tool showing a half exposed state of a transfer head in starting to be used.
Figure 6:
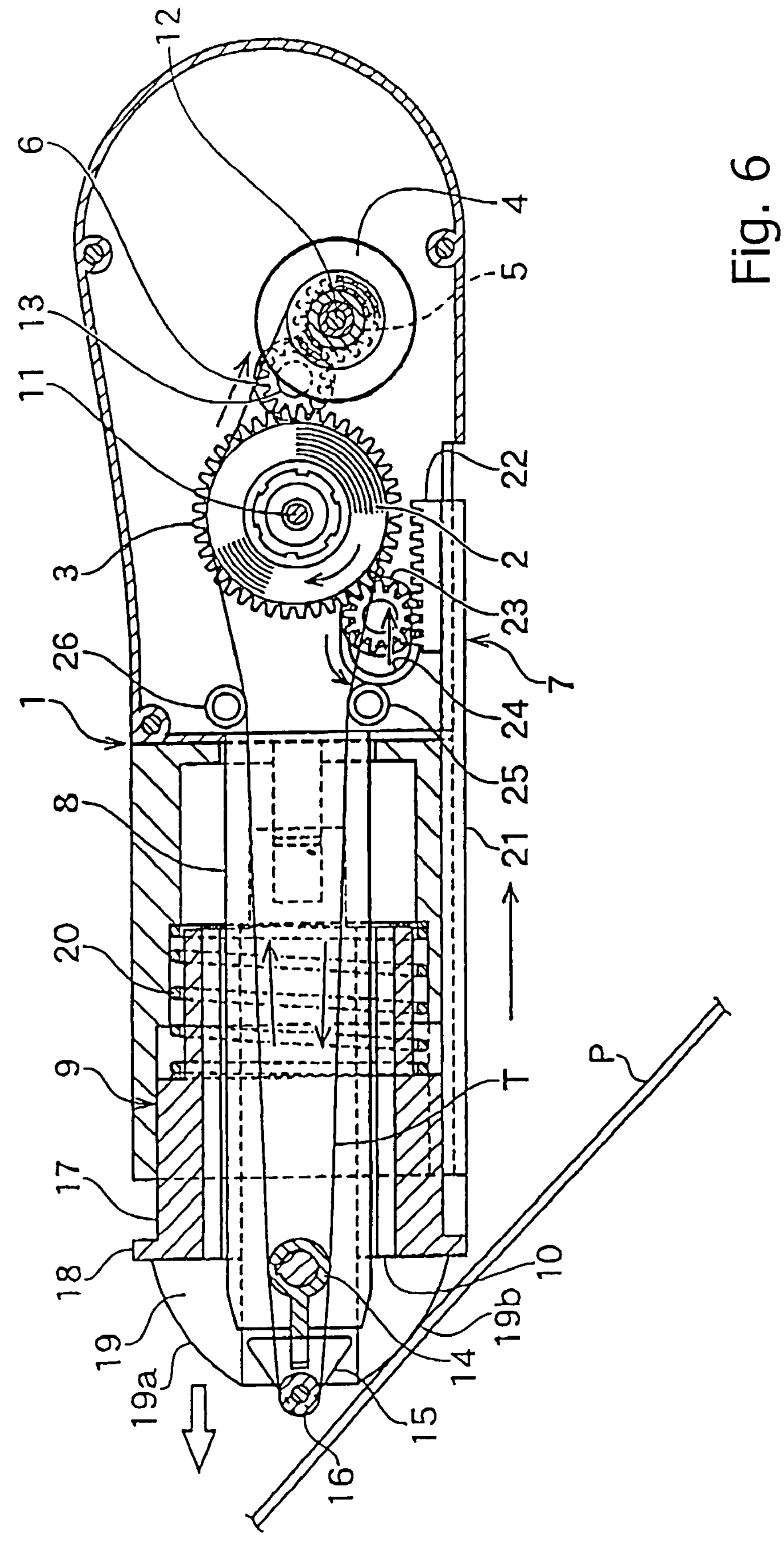
FIG. 6 is a vertical sectional side view of the coating film transfer tool.
Figure 7:
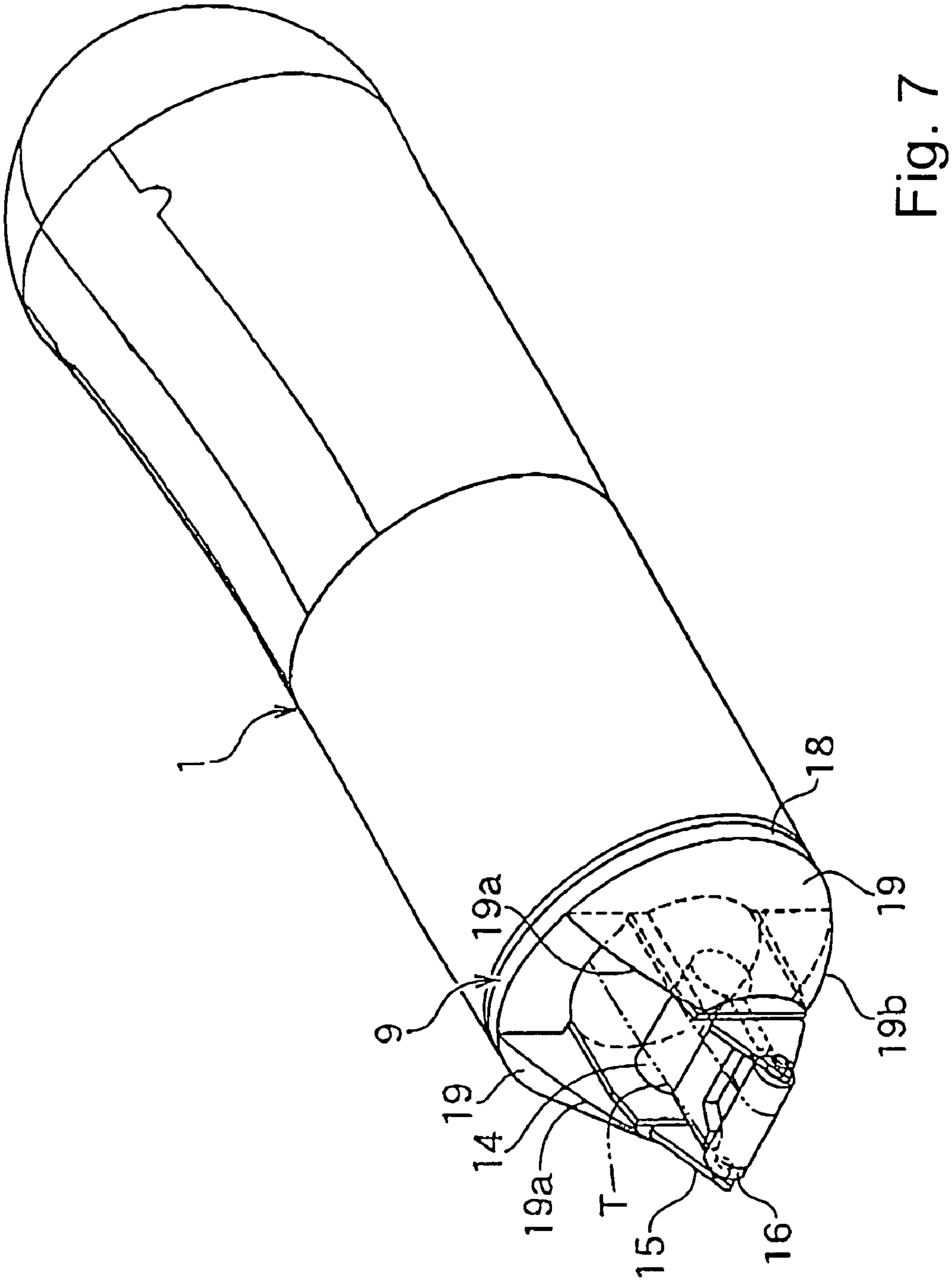
FIG. 7 is a perspective view of the coating film transfer tool showing a state of exposing a transfer head when used.
Figure 8:
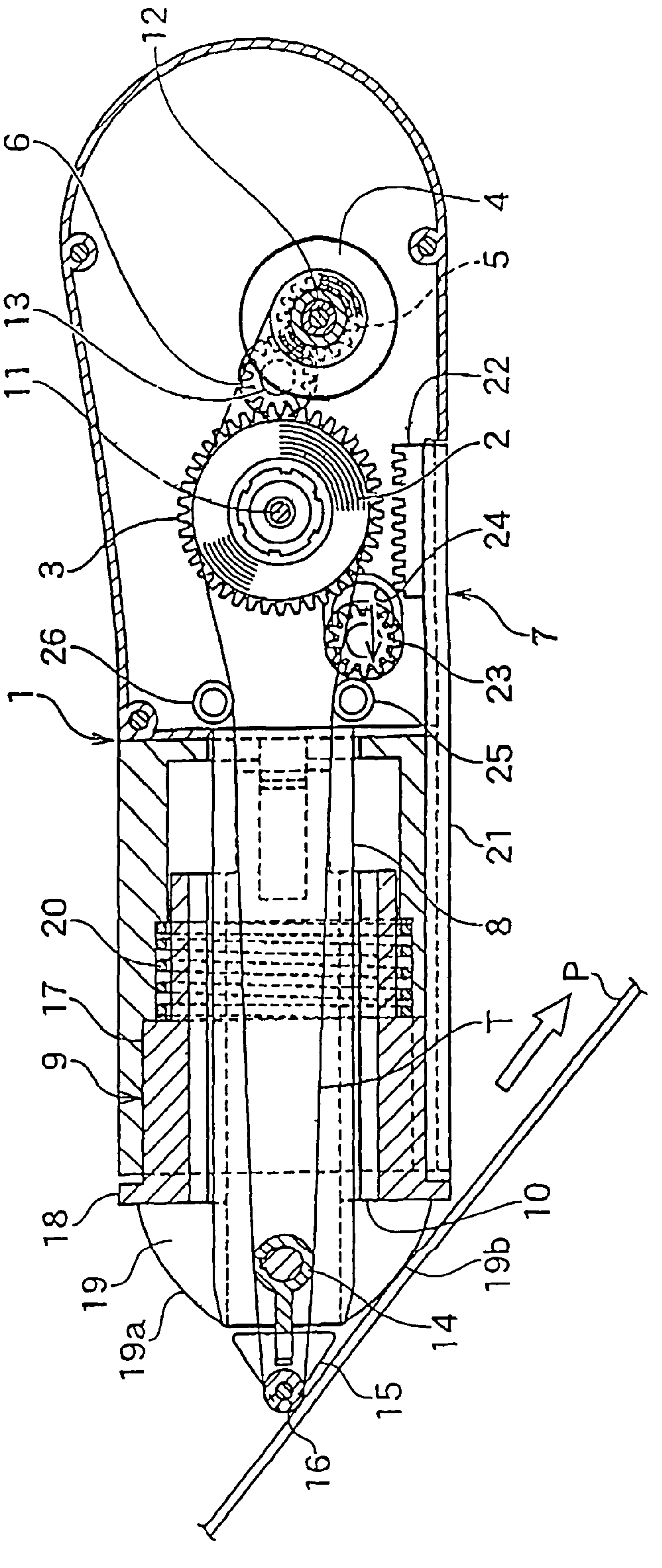
FIG. 8 is a vertical sectional side view of the coating film transfer tool.

FIG. 1 is a perspective view showing a state of protecting a transfer head when not used in a coating film transfer tool according to an embodiment of the invention, FIG. 2 is a perspective view in a state of viewing up from a lower side of the same, FIG. 3 is a partially broken perspective view of the same, FIG. 4 is a vertical sectional side view of the same, FIG. 5 is a perspective view showing a half exposed state of a transfer head in starting to be used, FIG. 6 is a vertical sectional side view of the same, FIG. 7 is a perspective view showing a state of exposing a transfer head when used, and FIG. 8 is a vertical sectional side view of the same.

As shown by FIG. 1 through FIG. 4, the coating film transfer tool of the invention includes a first gear 3 mounted with a supply reel 2 and wound with a transfer tape T, a second gear 5 mounted with a take-up reel 4 for taking-up the transfer tape T after a transfer operation, a third gear 6 indirectly brought in meshing engagement with the first gear 3 and the second gear 5, and a tape reeling out means 7 as shown by FIG. 3 and FIG. 4 at a rear portion of the inside of a case main body 1 having a cylindrical shape and formed of a synthetic resin, which includes a transfer head support member 8 and a head cap 9 at a front portion of the inside of the case main body 1.

The case main body 1 has an opening 10 at a front end thereof and is provided with a support shaft 11 of the first gear 3 mounted with the supply reel 2, a support shaft 12 of the second gear 5 mounted with the take-up reel 4, a support shaft 13 of the third gear 6 indirectly brought in mesh engagement with the first gear 3 and the second gear 5 at an inner side wall of a rear portion thereof.

As shown by FIG. 4, the transfer head support member 8 is held by a front portion at the inside of the case main body 1, and is provided with a transfer head 15 attached to a tape guide member 14 at a front end thereof. The transfer head 15 is projected from the opening 10 at the front end of the case main body 1, and rotatably carries the transfer roller 16 at a front end thereof.

As shown by FIG. 3, a barrel portion 17 of the head cap 9 having a cylindrical shape and formed of a synthetic resin is slidably fitted to a front portion at the inside of the case main body 1. An outer periphery of a front end of the barrel portion 17 is formed with a ring-like projection 18 projected to an outer side, in which left and right sides of the ring-like projection 18 are formed with a pair of left and right protecting members 19, 19 projected to a front side in a converging tapering shape. The protecting member 19 has upper and lower end edges 19*a*, 19*b*, at least the lower end edge 19*b* which comes into contact with a paper face P (refer to FIG. 4) constituting a face on which a transfer is bulged into a circular arc shape.

The head cap 9 is urged to project to the front side from the front end opening 10 of the case main body 1 by a coil spring 20 provided at a rear side of the barrel portion 17 at a front portion of the inside of the case main body 1, and is maintained at an advanced position in a state of covering two left and right side faces of the transfer head 15 by the two left and right protecting members 19, 19 at a front end thereof when not used.

The tape reeling out means 7 includes an operating rod 21 moved in cooperation with a movement in the front and rear directions of the barrel portion 17 of the head cap 9, a rack 22 moved in cooperation with a movement in the front and rear directions of the operating rod 21, a pinion 23 meshing with the rack 22, and a long hole 24 making the pinion 23 movable in front and rear directions and bringing the pinion 23 into a position so as to be able to be brought in mesh engagement with the first gear 3 mounted with the supply reel 2 and so as to separate the pinion 23 from the first gear 3.

As shown by FIG. 4, the pinion 23 is brought in mesh with the rack 22 at an advanced position of the head cap 9 when not used and is made movable to be able to be brought in mesh with the first gear 3 mounted with the supply reel 2 by moving the rack 22 in moving back the head cap 9 when started to be used as shown by FIG. 6.

The pinion 23 rotates the supply reel 2 by being brought in mesh with the first gear 3 in accordance with moving back the head cap 9 in starting to be used shown in FIG. 6 to reel out the transfer tape T wound around the supply reel 2 by a desired length in accordance with the amount of rotating the pinion 23.

On the other hand, at a rear position of the head cap 9 shown in FIG. 6, the pinion 23 is detached from the rack 22 to be able to be idled, and after having been detached from the rack 22, guided by the long hole 24, the pinion 23 can be detached from the first gear 3 to an original position at which the pinion 23 was disposed when the head cap 9 was disposed at the advanced position.

Thereby, the pinion 23 is brought in mesh with the rack 22 and the first gear 3 when the head cap 9 is moved to the rear position and is brought in mesh with the first gear 3 when the head cap 9 is moved to the advanced position.

The transfer tape T is wound around the take-up roller 4 from the supply reel 2 by way of a first guide pin 25, the transfer roller 16 of the transfer head 15 and a second guide pin 26.

Next, an explanation will be given of a procedure of operating the coating film transfer tool according to the invention.

As shown by FIG. 4, when not used, the head cap 9 is urged to project to a front side from the front end opening 10 of the case main body 1 by the coil spring 20 contained at the rear side of the barrel portion 17 at the front portion of inside of the case main body 1, and is maintained at the advanced position in a state of covering the two left and right side faces of the transfer head 15 by the left and right protecting members 19, 19.

In starting to be used as shown by FIG. 6, by pressing the lower end edges 19*b* in a circular arc shape at the protecting members 19 projected to the front end of the head cap 9 against the paper face P to press against the urge force of the coil spring 20, the barrel portion 17 of the head cap 9 is moved back to inside of the case main body 1 to half expose a portion of the transfer head 15 (refer to FIG. 5).

At this occasion, the pinion 23 of the tape reeling out means 7 is moved to the rear side in cooperation with the rack 22 moved back by way of the operating rod 21 by moving back the head cap 9, brought in mesh with the first gear 3 and is rotated by further moving back the rack 22 to rotate the first gear 3.

Thereby, the transfer tape T wound around the supply reel 2 is automatically reeled out by a length in accordance with an amount of rotating by the pinion 23 and is supplied onto the transfer roll 16 of the transfer head 15.

Therefore, in starting to be used, the transfer tape T holding the coating film can be disposed on the transfer roll 16, and coating film detachment can be prevented.

When the head cap 9 is further pressed to be moved back to the rear position at inside of the case main body 1 while pressing the lower end edges 19*b* in the circular arc shape of the protecting members 19 of the head cap 9 against the paper face P as shown by FIG. 8, the transfer head 15 is completely exposed from the head cap 9 (refer to FIG. 7) and the pinion 23 is detached from the rack 22 to be idled.

When the transfer head 15 is slid in an arrow mark direction of FIG. 8 in this way, by a frictional resistance produced between the transfer tape T and the paper face P, the transfer tape T is drawn by rotating the supply reel 2 along with the first gear 3, and a coating film of glue, a correcting film or the like can easily be transcribed onto the paper face P.

The transfer tape T after having been transcribed is reeled by the take-up roller 4 rotated in synchronism with the first gear 3 by way of the third gear 6 and the second gear 5, and the pinion 23 detached from the rack 22 is separated from the first gear 3 by its own weight and is returned to the original position at which the pinion 23 was disposed when the head cap 9 was disposed at the advanced position.

Further, the pinion 23 may be made able to be returned to the original position by an urge force of a spring or the like.

The above description of preferred embodiments has been given by way of example. From the disclosure given, those skilled in the art will not only understand the present invention and the attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A coating film transfer tool including a first gear mounted with a supply reel, a second gear mounted with a take-up reel provided at an inside of a case main body and a transfer tape wound around the supply reel and adapted to be taken up by the take-up reel, said transfer tape being guided along a transfer head projected from a front end opening of the case main body; wherein a front end portion of the case main body is provided with a head cap slidably disposed in front and rear directions between an advanced position for covering the transfer head and a rear position for exposing the transfer head, said head cap being urged in a direction of the advanced position by a spring, and said head cap when started to be used, being movable to the rear position by pressing a front end portion of the head cap against a face on which a transfer is to be made; and wherein inside of the case main body there is provided a tape reeling out means for reeling out the transfer tape to the transfer head, said tape reeling out means being movable in cooperation with a movement of the head cap to the rear position when started to be used, for reeling out the transfer tape to the transfer head.

2. The coating film transfer tool according to claim 1, wherein the tape reeling out means comprises at least a rack moved in cooperation with a movement in the front and rear directions of the head cap and a pinion meshing with the rack and with the first gear when the head cap is moved to the rear position, and not meshing with the first gear when the head cap is moved to the advanced position.

3. The coating film transfer tool according to claim 2, wherein the pinion is adapted to be detached from the rack at the rear position of the head cap.

4. The coating film transfer tool according to claim 3, wherein the pinion detached from the rack is separated from the first gear, being adapted to be returned to an original position the pinion holds when the head cap is in the advanced position.

* * * * *